(12) United States Patent
Tourteaux et al.

(10) Patent No.: US 7,243,634 B2
(45) Date of Patent: *Jul. 17, 2007

(54) TURBOCHARGING AND PRECOMBUSTION CHAMBER SPARK PLUG INTERNAL COMBUSTION ENGINE, IGNITION METHOD AND APPLICATION

(75) Inventors: Nicolas Tourteaux, Rueil Malmaison (FR); Cyril Robinet, Igny (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/531,731

(22) PCT Filed: Oct. 17, 2003

(86) PCT No.: PCT/FR03/03081

§ 371 (c)(1),
(2), (4) Date: Sep. 21, 2005

(87) PCT Pub. No.: WO2004/036012

PCT Pub. Date: Apr. 29, 2004

(65) Prior Publication Data

US 2006/0096571 A1    May 11, 2006

(30) Foreign Application Priority Data

Oct. 18, 2002   (FR) .................................. 02 13016

(51) Int. Cl.
*F02B 19/14* (2006.01)
(52) U.S. Cl. ...................... 123/261; 123/266; 123/280; 123/284; 123/293

(58) Field of Classification Search ................ 123/255, 123/261, 266, 268, 275, 280, 284, 293
See application file for complete search history.

(56) References Cited

U.S. PATENT DOCUMENTS 743,097 A * 11/1903 Phail ........................... 123/255
762,960 A *  6/1904 Tuck et al. .................. 123/255

(Continued)

FOREIGN PATENT DOCUMENTS

EP          0 957 246 A2    11/1999

(Continued)

*Primary Examiner*—T. M. Argenbright
(74) *Attorney, Agent, or Firm*—Nicolas E. Seckel (57) ABSTRACT

The invention concerns an internal combustion engine with at least one engine member, the engine member including a combustion chamber (4) of a combustible mixture with fuel components and oxidants, an ignition system of the combustible mixture by an igniter (7), sequential let-through devices for the fuel and oxidant components and for the combustion products, the engine being of the supercharging type by boost pressure of the oxidant components upstream of the engine member. According to the invention, the ignition system includes a closed head (6) (12*a*) substantially spherical enclosing the igniter in a precombustion chamber, the head including a set of orifices (5) intended to communicate the combustion chamber and the precombustion chamber so that combustible mixture may flow into the precombustion chamber. In a variation of the invention, at least one of the let-through devices is a direct injector in the combustion chamber for, in all or in part, the fuel components and/or fuels. A method and an application are also described.

19 Claims, 3 Drawing Sheets

U.S. PATENT DOCUMENTS

| | | | | |
|---|---|---|---|---|
| 1,956,586 | A | * | 5/1934 | Palmer ........................ 123/298 |
| 4,019,473 | A | * | 4/1977 | Kamiya ....................... 123/275 |
| 4,091,772 | A | * | 5/1978 | Heater et al. ................ 123/275 |
| 4,236,490 | A | | 12/1980 | Correll |
| 4,421,079 | A | * | 12/1983 | Wade .......................... 123/255 |
| 5,992,364 | A | | 11/1999 | Bubeck et al. |
| 7,025,037 | B2 | * | 4/2006 | Robinet ....................... 123/261 |

FOREIGN PATENT DOCUMENTS

| | | |
|---|---|---|
| FR | 2 781 840 | 2/2000 |
| FR | 2 810 692 | 12/2001 |

* cited by examiner

Fig. 3
1/ INJECTION / WETTING OF THE PRECOMBUSTION CHAMBER HEAD

Fig. 4
2/ VAPORISATION OF THE FUEL ON PRECOMBUSTION CHAMBER HEAD

Fig. 5
3/ FUEL VAPOUR RISE FROM THE PRECOMBUSTION CHAMBER DURING THE COMPRESSION PHASE

Fig. 6
4/ COMBUSTION PHASE

TURBOCHARGING AND PRECOMBUSTION CHAMBER SPARK PLUG INTERNAL COMBUSTION ENGINE, IGNITION METHOD AND APPLICATION

The present invention concerns an internal combustion engine with supercharging and sparking plug with precombustion chamber, an ignition method and an application of the method to the engine. It is intended for the industry of fuel, gas engines or others, with two or four-stroke internal combustion, for motorised vehicles such as motorcycles, automobiles, aircrafts . . . as well as motorised apparatus such as generators, toolings or others. Although preferably implemented in a piston/crankshaft engine, it may be applied to a rotary type engine.

Internal combustion engines have been known for numerous years and have evolved constantly. One considers here, as state of the art, the most conventional internal combustion engines, i.e. with piston and crankshaft, enabling to transform an alternate movement of a piston under the effect of the combustion of a combustible mixture, into a circular movement. This type of engine includes one or several engine members. Each engine member includes a combustion chamber, also called cylinder, of a combustible mixture with fuel and oxidant components, generally petrol and air, and filled with a compression system, in such a case a piston for this type of engine, an ignition system of the combustible mixture by an electric spark generator as well as sequential let-through devices for the fuel and oxidant components and for the combustion products. The operation of this type of engine, regardless whether two or four-stroke is known conventionally and will not be detailed here. One considers here more particularly the supercharged engines wherein one introduces in the combustion chamber at least the oxidant components at high pressure thanks to a pressure booster. This pressure booster is generally a turbine actuated by the exhaust gas and which compresses the air which must be injected in the cylinders. Other types of pressure boosters may be used, the turbo-compressors, the simple compressors, the pressure wave systems, etc.

The supercharged engines require thermal protection of the boost pressure system. Indeed, by considering the case of a turbine actuated by the exhaust gas, the former is exposed directly to the flux of hot gases coming out of the engine while the turbine shows limited destructive injected maximum temperature. Usually, to remedy this shortcoming, one resorts to enrichment by addition of fuel to limit the temperature of the gases burnt at the outlet of the engine. Indeed, the surplus of fuel thus provided may not burn since the quantity of air present in the cylinder is insufficient (the quantity of air present in the cylinder only enables to burn the fuel equivalent to the richness 1), and this surplus of fuel while evaporating (latent evaporation heat) enables the load to cool down. The gases come out therefore less hot from the cylinder. However, this effect is proportional to the surplus of petrol provided and said petrol is only used for cooling down the gas which causes an increase in consumption.

For some years, it has been sought to optimise the operation of internal combustion engines and in particular to reduce their fuel consumption as well as the rejection of combustion products, whereas the latter had more and more to become ultimate combustion products and limit the oxidised nitrogen species. To do so, improvements have been introduced to the basic operation of this type of engine. Such improvements concern for instance the ignition device, additional devices, and modalities for supplying the oxidant and fuels components, notably with direct injection engines.

Progress made in electronics and calculators have also enabled to improve the operation of engines.

For instance, one knows from the patent EP-0831213 held by DAIMLERCHRYSLER AG, an internal combustion engine with direct injection which uses a spark ignition with an ignition sparking plug. An injector enables with high pressure to inject directly the fuel components into the combustion chamber. The sparking plug includes simply a sleeve which is open in the combustion chamber.

With the applications FR-2.781.840 and FR-2.810.692 one knows particular arrangements of the engine member with precombustion chamber separated from the combustion chamber by a wall not letting through the flame front generated by the ignition of a combustible mixture in the precombustion chamber.

One knows from EP-0957246 a gas engine ($CH_4$) whereof the control of the ignition is performed by the injection of a small quantity of liquid fuel into a precombustion chamber.

If the set of these improvements has largely enabled to reduce the consumption and the emissions, the corresponding engines still have limitations. In particular, the supercharged engines are penalised by excessive fuel consumption due to enrichment.

The invention intends to provide an ignition system enabling to reduce enrichment in a supercharged engine while enabling correct combustion, i.e. with a correct combustion output, even when the mixture is prepared under detrimental conditions. In a preferred embodiment, the ignition system replaces the sparking plug on a conventional engine and no specific arrangement to the cylinder head is necessary. The ignition system includes in its portion in relation with the combustion chamber, a substantially spherical head drilled with passage holes or orifices or passageways, these terms being equivalent. Inside said head, one finds one or several electrodes enabling to create a spark by applying a voltage therebetween.

Thus the invention concerns an internal combustion engine with at least one engine member, the engine member including:

a combustion chamber of a combustible mixture with fuel and oxidant components fitted with a compression system, an ignition system of the combustible mixture by an igniter, sequential let-through devices for the fuel and oxidant components and for the combustion products, the engine being of the supercharging type by boost pressure of the oxidant components upstream of the engine member.

According to the invention, the ignition system includes a closed head, substantially spherical with a wall enclosing the igniter in a precombustion chamber, the head including a set of orifices intended to communicate the combustion chamber and the precombustion chamber so that combustible mixture may flow into the precombustion chamber.

In various modes for implementing the invention, the following means may be used individually or according to all the technically possible combinations:

the igniter includes a generator of electric sparks, the ignition system is a sparking plug with precombustion chamber, the ignition system includes a system for introducing the fuel and oxidant components directly into the precombustion chamber, the ignition system includes an introduction device enabling direct introduction of a combustible mixture into the precombustion chamber, the separation wall between the precombustion chamber and the combustion chamber of the head is convex outwardly of the precombustion chamber, alternately, the separation wall between the precombustion chamber and the combustion chamber of the head is concave outwardly of the precombustion chamber, alternately, the separation wall between the precombustion chamber and the combustion chamber of the head is substantially a polyhedron, a cone, the sparking plug head includes a grid or porous material type wall, the separation wall between the precombustion chamber and the combustion chamber of the head is made of a material with thermal conductivity greater than 10 W/K/m, the separation wall between the precombustion chamber and the combustion chamber of the head is made of a material with thermal conductivity preferably greater than 30 W/K/m, the separation wall between the precombustion chamber and the combustion chamber of the head is made of high conductivity copper alloy, the copper alloy is CuCr1Zr, the separation wall between the precombustion chamber and the combustion chamber of the head includes a refractory material, the wall of the head is covered with a substance facilitating the reactive combustion of the fuel and oxidant components and/or the ultimate degradation of the combustion products, each orifice of the precombustion chamber on the head has a diameter smaller than or equal to 3 mm, the orifices of the precombustion chamber of the head are minimum three in number, the orifices of the precombustion chamber of the head are arranged on the head so that the combustion of the combustible mixture in the precombustion chamber induces jets of matter through the orifices to the combustion chamber distributed to ensure homogeneity of the combustion of the combustible mixture substantially in the whole combustion chamber, at least one of the let-through devices is a direct injector in the combustion chamber for, in all or in part, the fuel and/or oxidant components, the compression system is a piston in a cylindrical combustion chamber with central axis, the injector being arranged substantially axially opposite the piston and the ignition system laterally with respect to the injector, and the orifices are predominantly arranged towards the axis, the compression system is a piston in a cylindrical combustion chamber with central axis, the ignition system being arranged substantially axially opposite the piston and the injector laterally with respect to the sparking plug, and the orifices are distributed regularly on the surface of the head, the compression system is a piston in a cylindrical combustion chamber with central axis, the injector and the ignition system being arranged laterally with respect to said axis, and the orifices are predominantly arranged towards the axis, the head of the sparking plug is arranged on a portion of the path of the fuel components injected so that said head may be wetted by said fuel components during the direct injection thereof, at least one orifice has dimensions of passageway letting through a flame front from the precombustion chamber to the combustion chamber, each orifice letting through the flame front has a diameter ranging between 1 and 3 mm, at least one orifice has dimensions of passageway not letting through a flame front from the precombustion chamber to the combustion chamber while letting through unstable species resulting from the combustion in the precombustion chamber in order to enable self-ignition of the combustible mixture of the combustion chamber, (the head may therefore include orifices of both previous types, i.e. letting through and not letting through the flame front), the number of orifices enabling the propagation of a flame front provided in the head of the precombustion chamber body varies from 1 to 5 and preferably is 1 and the number of orifices not enabling the propagation of a flame front varies from 1 to 20, preferably from 3 to 15, the set of orifices has dimensions of passageway not letting through the flame front from the precombustion chamber to the combustion chamber while letting through unstable species, each orifice not letting through the flame front has a diameter smaller than 1 mm, each orifice not letting through the flame front has a diameter ranging between 0.5 and 1 mm, each orifice has a length smaller than its diameter, the engine includes moreover means enabling to re-inject with the oxidant components a portion of the combustion products, the injector has multiple jets, with jets directed towards the head, the jets are sequentially distributed with time, the richness of the mixture is greater than or equal to one in at least one embodiment of the engine.

The invention also concerns an ignition method of an internal combustion engine having at least one engine member, the engine member including:

a combustion chamber of a combustible mixture with fuel and oxidant components fitted with a compression system, an ignition system of the combustible mixture by an igniter, sequential let-through devices for the fuel and oxidant components and for the combustion products, the engine being of the supercharging type by boost pressure of the oxidant components upstream of the engine member.

According to the method of the invention:

one implements an ignition system including a closed head substantially spherical with a wall enclosing the igniter in a precombustion chamber, the head including a set of orifices intended to communicate the combustion chamber and the precombustion chamber so that combustible mixture may flow into the precombustion chamber, one introduces in the combustion chamber the fuel components and the oxidant components which form the combustible mixture in the combustion chamber, one causes an ignition of the combustible mixture in the precombustion chamber by the igniter, the orifices of the precombustion chamber enabling the ignition of the combustible mixture of the combustion chamber.

The previous steps are also implemented in a method characterised in that one lets through the orifices of the unstable species resulting from the combustion in the precombustion chamber in order to enable self-ignition of the combustible mixture of the combustion chamber without however letting through the flame front from the precombustion chamber to the combustion chamber.

The invention also concerns an application of the methods according to the previous features to the engine according to one or several of the features of engines listed previously, and in particular, one implements direct injection.

The invention finally concerns a sparking plug with precombustion chamber for implementation in the engine of the invention and according to one or several of the corresponding features listed previously.

The implementation of the invention in a supercharged engine enables therefore to limit the enrichment on high load since the combustion is faster and terminates sooner in the engine cycle. The gas derived from the combustion exit therefore not so hot from the cylinder since the time between the end of combustion and the valve opening is longer. The enrichment necessary to the protection of the turbine may therefore be reduced, hence smaller consumption on this type of supercharged engine with respect to a conventional ignition with conventional electrode type sparking plug. The other advantages provided by the present invention are the protection of the electrode(s) of the sparking plug. The probable presence of a carburized mixture in the vicinity of the electrodes is higher.

Moreover, the ignition system with precombustion chamber enables to obtain faster combustion, even in the case of little homogeneous mixture. Indeed, on the one hand several flame fronts reach different zones of the combustion chamber and on the other hand, the radicals emitted by the orifices of the igniter seed the combustion chamber in different points and under the combined effects of the pressure and of the temperature generated by the rising piston, these precursors ignite the mixture in different points of the combustion chamber. The probability of having precursors in a zone favourable to the initiation of the combustion is therefore much higher than in the case of a conventional sparking plug. Moreover, the wall of the precombustion chamber protects the electrodes from the impact of liquid fuel thereon, hence a better behaviour on cold start and in reducing the soiling of the sparking plug. Then, in a particular embodiment, it is possible to use a jet of injector wetting directly the walls of the precombustion chamber, which causes the carburized mixture to rise inside the precombustion chamber. This may have beneficial effects on the start and the initiation generally.

Finally, in the case of the layered combustion, the injection of fuel on the hot head of the igniter enables to increase the AI/AA robustness by vaporising the fuel close to the electrodes (AI corresponds to the injection advance and AA to the ignition advance).

The invention may thus be implemented advantageously in the case of engines with direct injection of petrol or of air-petrol mixture as will be seen below in detail. The direct injection may indeed concern either individual fuels generally under high pressure of 100 bars, or a pre-mixture of fuels/oxidants generally under low pressure, of the order of 5 to 10 bars.

The present invention will now be exemplified with the following description and in relation with:

FIG. 1 which represents, seen from the precombustion chamber, the progression of the combustion produced by a spark, FIG. 2 which represents, seen from the combustion chamber, the different orifices of the sparking plug head, FIGS. 3, 4, 5, 6 which represent as a sectional view, a cylinder for different operating phases of an engine according to the invention in the case of direct injection, FIG. 7 which represents an example of embodiment of an ignition system with a sparking plug, as a partial sectional view, FIG. 8 which represents an example of embodiment of a head of the ignition system.

The ignition systems whereof the igniter is a discharger intended to produce electric sparks, of the type sparking plug, may have different configurations in relation to the type of engine and/or to the performances desired. For instance the sparking plugs may be of various lengths. The invention which implements a sparking plug with precombustion chamber may employ different configurations of sparking plugs and a particular example will be given at the end of the description. In the invention, the sparking plug includes a precombustion chamber according to features which will now be detailed.

Experiments have been carried out on several configurations of ignition systems according to the invention. The features of the sparking plug with precombustion chamber more particularly assessed are:

Volume: 700 mm$^3$

Section of passage: 5.1 mm$^2$

S/V ratio (mm$^{-1}$): 7.4×10$^{-3}$ mm$^{-1}$ (S being the sum of the sections of the passageways and V the volume of the precombustion chamber)

Inter-electrode distance: 0.7 mm.

As regards the S/V ratio, it is a quality indicator. The lower this ratio, the better the output of use of the oxidant and of fuel. The optimum case is that of the spherical precombustion chamber.

The ignition system of the sparking plug type with precombustion chamber of the invention is a component which does not require any particular machining of the engine. The implantation may take place in a conventional engine sparking plug well since its diameter may be smaller than or equal to 14 mm. The volume of the precombustion chamber may range between 0.2 and 2 cm$^3$. Preferably, the precombustion chamber has a volume smaller than 1.5 cm$^3$, generally ranging between 0.5 cm$^3$ and 1.5 cm$^3$. Generally, the ratio between the volume of the precombustion chamber and the dead volume of the main chamber varies between 0.1 and 5%, preferably between 0.1 and 2%. The form of the head of the ignition system is preferably a spherical cap.

Optionally, the ignition system may moreover include an intake enabling to supply directly the precombustion chamber with a combustible mixture formed upstream or to introduce fuel, the air being then mixed with the fuel in the precombustion chamber.

The ignition system includes in its portion in relation with the combustion chamber, a spherical head drilled with holes or orifices or passageways. These terms being equivalent in the context of the invention. Inside said head, one finds the igniter in the form of one or several electrodes enabling to create a spark by applying a voltage therebetween.

When developing the ignition system, several configurations of material have been tested for the wall of the precombustion chamber, i.e.: Steel 35CD4; alloy Ni—Fe—Cr, copper alloy whereof brass or copper-nickel-zinc alloys or with nickel or aluminium; high conductivity copper alloy CuCr$_1$Zr. The best results have been obtained with the latter material. The alloy CuCr$_1$Zr is a grade of the alloy CRM16x with a rated composition Cr>0.4%, Zr from 0.022% to 0.1% and the remainder is copper.

As stated above, the precombustion chamber may be made of a material having a thermal conductivity greater than 10 W/K/m and preferably greater than 30 W/K/m. One may thus use materials whereof the thermal conductivity may reach 350 W/K/m. The use of such a material, preferably a copper alloy, enables to evacuate the energy at the wall of precombustion chamber and thus to make up for the occurrence of hot points at the precombustion chamber. For instance, for the material subject to in-depth experiments, the alloy CuCr1Zr, the thermal conductivity at 20° C. of 320 W/K/m.

For exemplification purposes for other copper-based usable materials, one may consider a grade of brass: CUZn37 of conductivity: 113 W/K/m.

The following table shows different binary brasses, copper-nickels, copper-aluminium and copper-nickel-zinc alloys being usable as material for the precombustion chamber body. The level of thermal conductivity as well as the mechanical handling at high temperature (450–1000 K) determines the selection of the material.

Brass: physical properties

| Property (composition according to the standard NF A 51-101) | Cu Zn 5 | Cu Zn 10 | Cu Zn 15 | Cu Zn 20 | Cu Zn 30 | Cu Zn 33 | Cu Zn 36 | Cu Zn 40 |
|---|---|---|---|---|---|---|---|---|
| Thermal conductivity at 20° C. [W/(m · K)] | 234 | 188 | 159 | 138 | 121 | 117 | 117 | 121 |

Copper-nickel-zinc alloys: physical properties

| Property (composition according to the standard NF A 51-101) | Cu Ni 10 Zn 27 | Cu Ni 12 Zn 24 | Cu Ni 15 Zn 21 | Cu Ni 18 Zn 20 | Cu Ni 18 Zn 27 | Cu Ni 10 Zn 42 Pb 2 | Cu Ni 18 Zn 19 Pb 1 |
|---|---|---|---|---|---|---|---|
| Thermal conductivity at 20° C. [W/(m · K)] | 38 | 38 | 34 | 29 | 25 | 34 | 25 |

And finally the alloys:
Copper-nickel: 21 W/(m·K) (Cu Ni 44 Mn) to 63 W/(m·K) (Cu Ni 5 Fe)
Copper-aluminium: 75 to 84 W/(m·K) (Cu Al 5, Cu Al 6), 38 to 46 W/(m·K) (Cu Al 10 Fe 5 Ni 5)
These data are derived from "Technique de l'Ingénieur", Volume MB5—Etude et propriétés des métaux M 437

This type of sparking plug with precombustion chamber is used preferably with an engine showing optimised permeability of the cylinder head to the detriment of the aerodynamics of the combustion chamber. Indeed, the combustion mode resulting from the use of the sparking plug with precombustion chamber enables sufficient combustion speed to dispense with an increase in the combustion speed via the aerodynamics of the combustion chamber.

The invention may be implemented as well on a conventional supercharged engine wherein one introduces a combustible mixture in the combustion chamber, i.e. that the mixture has taken place upstream of the engine member, as on an engine with direct injection of the fuel components.

Engine tests for assessing the potential of sparking plugs with precombustion chamber have been conducted on heavily supercharged engines, i.e. up to more than 15 bars. These tests have enabled to put in evidence a path of improvement regarding full load enrichment (PME=efficient average pressure=13 bars) when using sparking plugs with precombustion chamber.

One has shown during experiments on this type of supercharged engine notably the following improvements: a reduction in full load enrichment, total or partial inhibition, pinkling phenomenon with a volumetric ratio ranging between 8 and 14, better use of the air.

Figure 1:
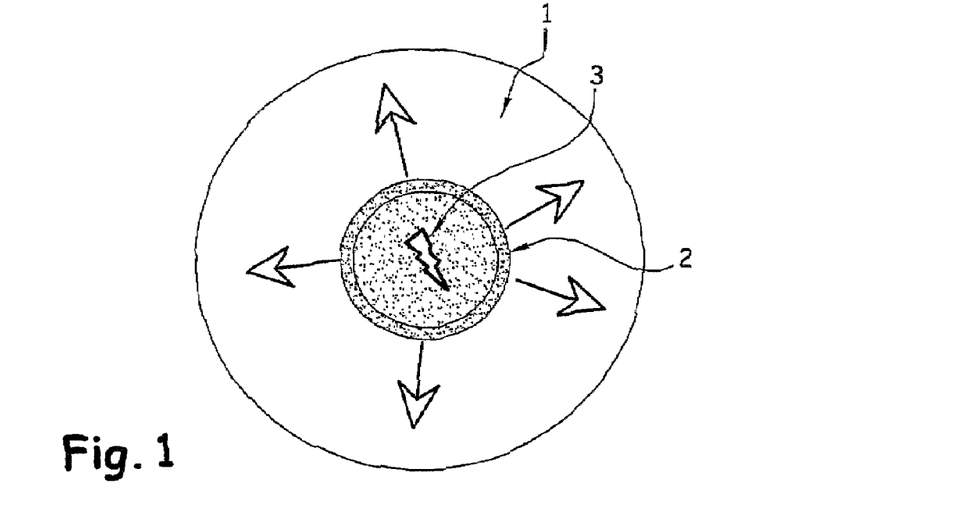

FIG. 1 represents therefore, as seen in the precombustion chamber 1, the progression of the combustion 2 generated by a spark 3.

Figure 2:
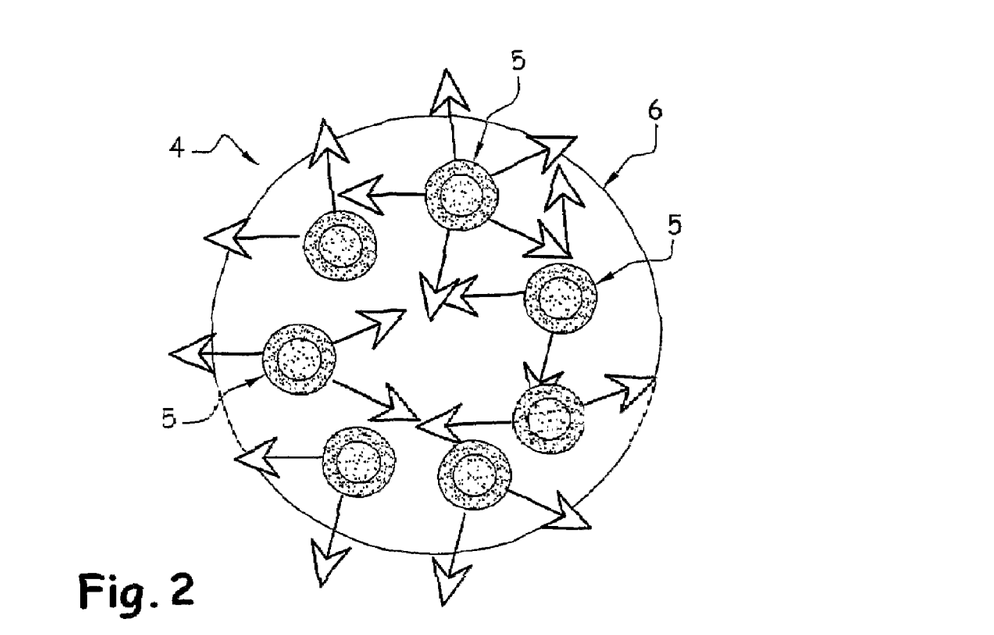
Figure 3:
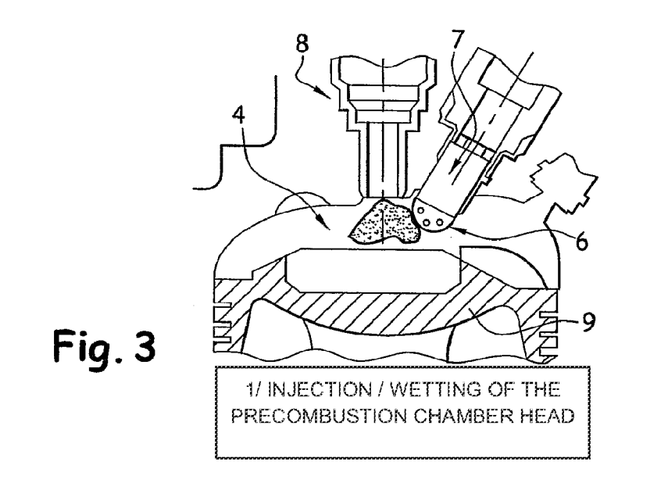
Figure 4:
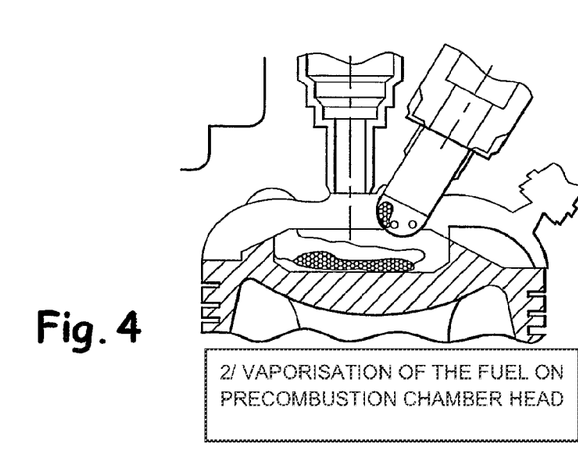
Figure 5:
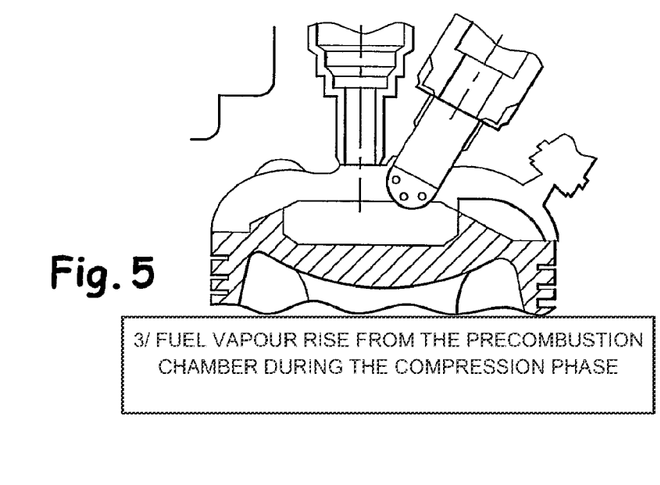
Figure 6:
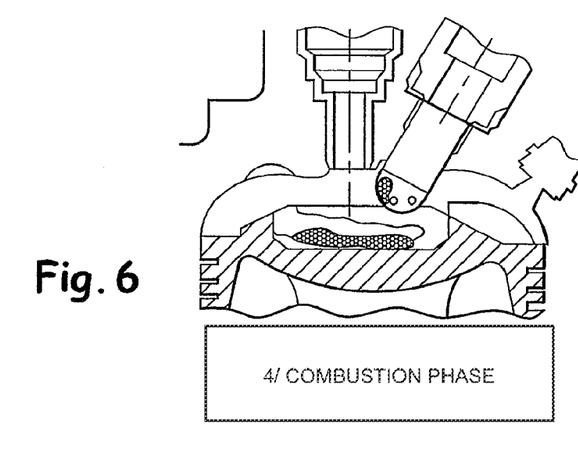

FIG. 2 represents therefore, as seen in the combustion chamber 4, the different orifices 5 of the wall of the head 6 of sparking plug enabling communications between the precombustion chamber 1 and the combustion chamber 4, also called main chamber. Thanks to these communications, on the one hand, combustible mixture flows from the combustion chamber towards the precombustion chamber and, on the other hand, after ignition in the precombustion chamber, the combustible mixture of the combustion chamber may finally ignite. The disposition of orifices enables substantially homogeneous distribution of the flame front and/or of the unstable species which enable the ignition of the combustible mixture of the combustion chamber.

Preferably the sparking plug and its head are a single component which replaces a traditional sparking plug which does not require any modifications of the cylinder head passageway for the sparking plug. The ignition system is thus formed of a device replacing the conventional sparking plug. One also contemplates that the system generating the spark be modified in relation to the form of the head and, for instance that the central electrode moves forward further in the head and comes closer to the wall of the former so that the electric arc is formed between the central electrode and the wall of the head. It should be understood that in such a case, the wall must include a conductive material of the electricity for the spark current to return to the ground. One also contemplates that the head of sparking plug be a removable part, for instance by screwing, and which may be unscrewed to gain access to the electrode(s) of the sparking plug for possible adjustment of the gap or inspection. In the latter case, it may be desirable that the head extends laterally towards the rear in a screwing zone on the cylinder head to be held and may not be unscrewed nor fall in the combustion chamber because of the vibrations of the engine.

It should be understood that the examples given are purely illustrative and that the invention may be varied according to diverse possibilities. It has been observed thus that a head with orifices of both types could be used, i.e. letting through and not letting through the flame front. Similarly, the orientations orifices may be optimised in relation to the relative disposition of the different members in the engine.

Thus, among the applications of the invention one may quote the engines with direct injection of the fuel components. Indeed, apart from the invention, the engines with direct injection are generally penalised when preparing the mixture with respect to the injection engines in inlet conduits by problems of homogeneity of the mixture in the combustion chamber. Similarly, the engines with direct injection exhibit, in certain configurations of arrangement of the injector and of the sparking plug, problems of direct impact of the fuel on the electrodes of the sparking plug, hence problems of cold start and of soiling of electrodes of the sparking plug. Finally, the engines with direct injection are sensitive to the impact of the relatively cold fuel on the walls of the cylinder. Still, for correct initiation (ignition), it may be necessary to have sufficient jet to come close to the sparking plug, which implies high walls effect.

The implementation of the invention, thanks to the head of the ignition system which encapsulates the electrode(s) of the sparking plug, enables to limit these shortcomings. FIGS. 3, 4, 5, 6 represent thus a particular implementation of the invention with an engine member with direct injection seen as an axial section of a piston 9 and going through a injector 8 and a sparking plug 7. The other inlet and exhaust members for sequential passageways of the oxidant components (possibly fuel) and for the combustion products, are not detailed therein. On FIG. 3, the phase of injection of the fuel components by the injector 8 is in progress and a portion of the fuels will wet the head 6 of the sparking plug 7 which surrounds the precombustion chamber. On FIG. 4, the engine being hot, the fuels are vaporised simultaneously on the piston 9 which includes a <<piston bowl>> and on the head 6 of the sparking plug 7. On FIG. 5, the phase of compression has begun and combustible mixture flows from the combustion chamber 4 towards the precombustion chamber 1 of the sparking plug 7. On FIG. 6, the phase of combustion has begun from the precombustion chamber 1 wherein a spark has been produced and by passing through the orifices 5 of the head 6, the flame front and/or according to the type of orifice, the unstable species for propagation to the combustion chamber 4.

As stated above previously, the implementation of the invention enables reduction in the pinking, this being notably perceivable in the case of the operation of the engine on high load. To give an order of magnitude, by low load operation of the engine is meant the operating range of the engine from idle to a quarter of the full load of the engine, preferably the range from idle to 10% of the full load in the case of an atmospheric engine and the range from idle to 5% of the full load in the case of an heavily supercharged engine.

In an alternate embodiment of the head of the ignition system, one implements orifices in the wall of the head which have a differential effect, letting through or not letting through the flame front in relation to the load of the engine. This effect may be obtained for instance by at least one orifice enabling the propagation of a flame front on low load and at least one orifice not enabling the propagation of a flame front under any load conditions or, then, through simply at least one orifice enabling the propagation of a flame front on low load. In the case of a low load operation of the engine, the flame front may flow from the precombustion chamber to the main combustion chamber by means of the passageway(s) enabling the propagation of a flame front and one causes thus the ignition of the main combustible mixture via a flame front. In the case of an operation on high load of the engine, the structure orifices which let through the flame front on low load is such that, on high load, the flame front does not flow any longer, said orifices causing an extinction of the flame front and these are then the unstable compounds from the combustion of the combustible mixture to the precombustion chamber which induce mass self-ignition of the main combustible mixture seeded with the unstable compounds in the main chamber.

One may explain this phenomenon as follows. Taking into account the small quantity of air/fuel mixture in the precombustion chamber in the case of low supercharge, the pressure rise in the precombustion chamber at the ignition is significantly less violent than in the case of high loads and the flame front obtained by the combustion of the mixture in the precombustion chamber may, thanks to the passageway of large diameter propagate in the main combustion chamber. Said continuous propagation of the flame front between precombustion chamber and main combustion chamber causes stability on low load similar to the conventional case of the controlled ignition engines. In the case of high loads, the quantity of carburized mixture in the precombustion chamber is from 3 to 7 times greater than the little supercharged case. Consequently, during the combustion of the mixture in the precombustion chamber, the pressure rise is significantly greater. The differential pressure between the precombustion chamber and the main chamber prevents the propagation of the flame front from the precombustion chamber to the main chamber. Nevertheless, the passageways let flow the flux of unstable compounds from the precombustion chamber to the main chamber and, during the rising of the piston, the compression produces mass self-ignition of the main mixture.

It should be understood that one may also use orifices letting through or not letting through the flame front regardless whether under all conditions or not to obtain differential effects said times in volume, certain types of orifices being arranged on the head preferably to have combustion-triggering effects in a more particular zone of the combustion chamber. These differential effects in relation to the load and to the volume may be combined by a particular arrangement of orifices of different structures on the head.

In another alternative embodiment of the head of the ignition system, possibly combined to the latter, the internal and/or external faces of the wall of the head of the precombustion chamber as well as, possibly, the walls of the orifices, are coated with a refractory coating layer, such as, for instance, coating layers en $Al_2O_3$, ZrY (not necessarily stoichiometric) and $TiB_2$. The thickness of these coating layers ranges generally between 5 and 100 μm, preferably 1 to 50 μm. One increases thus the efficiency of combustion in the precombustion chamber and improves the low load operation, in particular in the case of heavily overboosted engines.

Figure 7:
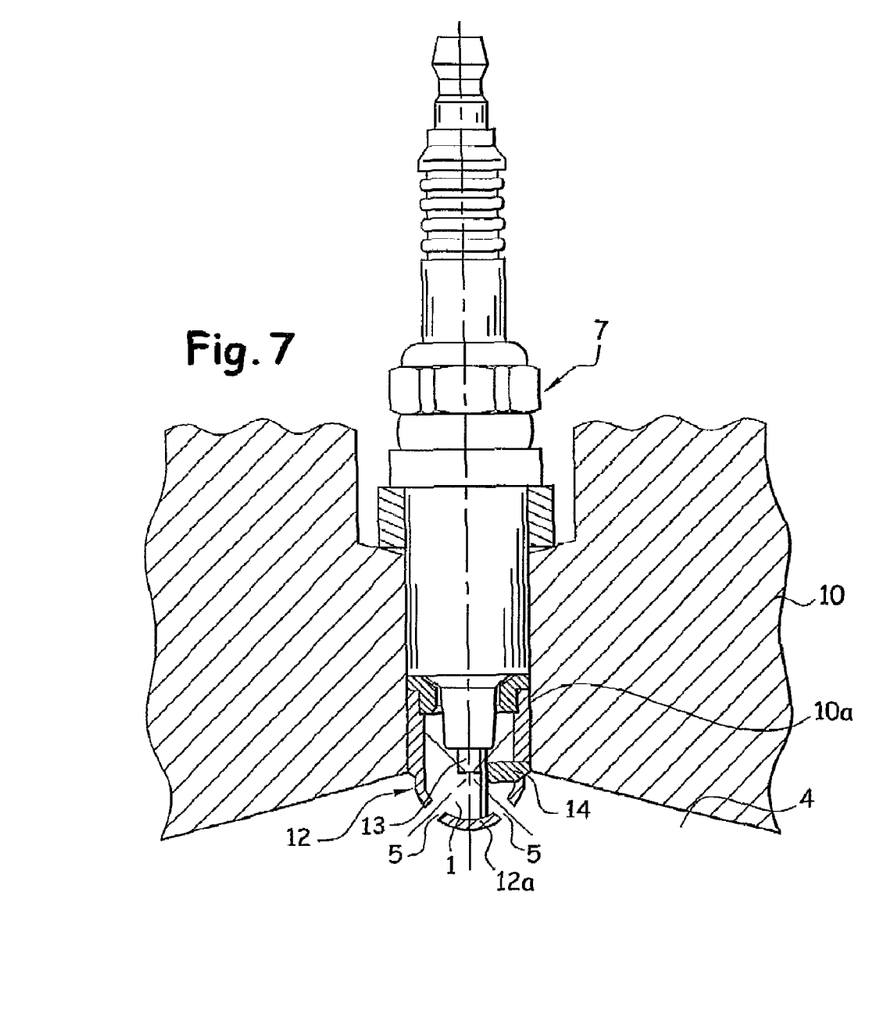

As stated above, different configurations of sparking plugs with precombustion chamber may be used. There is given on FIG. 7 a particular example of sparking plug with precombustion chamber which includes a body in the extension of the head. The sparking plug 7 is screwed in a thread 10a of the cylinder head 10 closing a cylinder of an internal combustion engine whereof only a portion has been represented. The sparking plug 7 includes a body 12 of precombustion chamber 1 generally tubular in shape and comprising a head 12a generally convex in shape, preferably having the form of a spherical cap. The head 12a of the body 12 of precombustion chamber 1 forms a separation wall between the combustion chamber 4 and the precombustion chamber 1. The precombustion chamber 1 includes the igniter comprising a central electrode 13 and a ground electrode 14. The head 12a forming the separation wall between the combustion chamber 4 and the precombustion chamber 1 is provided with different let-through orifices 5, represented more in detail on FIG. 8.

In this example, the orifices 5, generally cylindrical in shape, comprise a passageway 5a, having a large diameter, i.e. a diameter greater than 1 mm, generally ranging between more than 1 mm and 3 mm and a series of orifices 5b to 5i (7 in the embodiment of FIG. 8) having a small diameter, i.e. smaller than or equal to 1 mm. Generally, the length of the passageways is smaller than 1 mm and they are here oriented according to radii of the hemispherical head 12a. One has also seen that the orientation and/or the structure of orifices may be suited to the particular configuration of the element of the engine.

Figure 8:
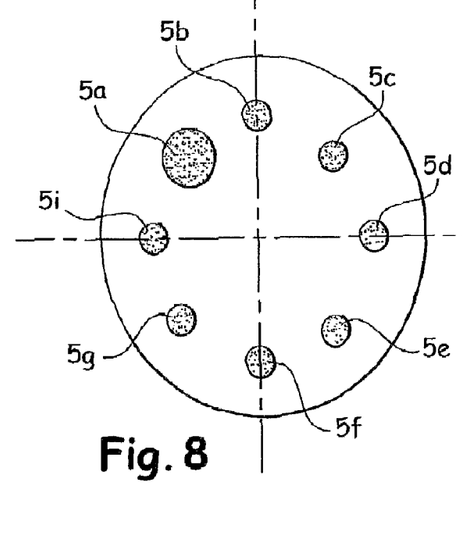

Although one has represented a single orifice 5a of diameter greater than 1 mm (preferred embodiment), the head 12a may include several orifices of large diameter. However in certain applications, as already seen with the differential effects orifices on the flame front in relation to the load, the number and the dimension orifices must be such that no flame front may propagate from the precombustion chamber to the combustion chamber when the engine operates on high load.

It should be understood that the examples given are purely illustrative and that it is possible to implement the invention according to diverse modalities without departing from its general framework.

The invention claimed is:

1. An internal combustion engine with at least one engine member, the engine member including:
   a combustion chamber of a combustible mixture with fuel and oxidant components fitted with a compression system,
   an ignition system of the combustible mixture by an igniter,
   sequential let-through devices for the fuel and oxidant components and for the combustion products,
   the engine being of the supercharging type by boost pressure of the oxidant components upstream of the engine member,
   wherein the fuel is exclusively liquid, and the ignition system includes a closed head substantially spherical with a wall enclosing the igniter in a precombustion chamber, the head including a set of orifices intended to communicate the combustion chamber and the precombustion chamber so that combustible mixture may flow into the precombustion chamber,
   wherein at least one orifice has dimensions of passageway not letting through a flame front from the precombustion chamber to the combustion chamber while letting through unstable species resulting from the combustion in the precombustion chamber in order to enable self-ignition of the combustible mixture of the combustion chamber.

2. An engine according to claim 1, wherein at least one orifice has dimensions of passageway letting through a flame front from the precombustion chamber to the combustion chamber.

3. An engine according to claim 1, wherein the set of orifices have dimensions of passageway not letting through the flame front from the precombustion chamber to the combustion chamber while letting through unstable species.

4. An engine according to claim 1, wherein each orifice not letting through the flame front has a diameter smaller than 1 mm.

5. An engine according to claim 1, wherein each orifice has a length smaller than its diameter.

6. An engine according to claim 1, wherein the separation wall between the precombustion chamber and the combustion chamber of the head is made of a material with thermal conductivity greater than 10 W/K/m.

7. An engine according to claim 1, wherein the separation wall between the precombustion chamber and the combustion chamber of the head is made of high conductivity copper alloy (CuCr1Zr).

8. An engine according to claim 1, wherein the orifices of the precombustion chamber of the head are minimum three in number.

9. An engine according to claim 1, wherein it is with direct injection of the fuel components in the combustion chamber.

10. An engine according to claim 9, wherein the compression system is a piston in a cylindrical combustion chamber with central axis, at least one of the let-through devices being a direct injector in the combustion chamber for, in all or in part, the fuel and/or oxidant components, the injector being arranged substantially axially opposite the piston and the ignition system laterally with respect to the injector, and the orifices are predominantly arranged axially to ensure homogeneity of the combustion of the combustible mixture substantially in the whole combustion chamber.

11. An engine according to claim 1, wherein the compression system is a piston in a cylindrical combustion chamber with central axis, at least one of the let-through devices being a direct injector in the combustion chamber for, in all or in part, the fuel and/or oxidant components, the ignition system being arranged substantially axially opposite the piston and the injector laterally with respect to the ignition system, and the orifices are distributed regularly on the surface of the head to ensure homogeneity of the combustion of the combustible mixture substantially in the whole combustion chamber.

12. An engine according to claim 1, wherein the compression system is a piston in a cylindrical combustion chamber with central axis, at least one of the let-through devices being a direct injector in the combustion chamber for, in all or in part, the fuel and/or oxidant components, the injector and the ignition system being arranged laterally with respect to said axis, and the orifices are predominantly arranged axially to ensure homogeneity of the combustion of the combustible mixture substantially in the whole combustion chamber.

13. An engine according to claim 1, wherein the head is arranged on a portion of the path of the fuel components injected so that said head may be wetted by said fuel components during the direct injection thereof.

14. An engine according to claim 9, wherein the richness of the mixture is greater than or equal to one in at least one embodiment of the engine.

15. An engine according to claim 1, wherein the ignition system and its head are a single component which replaces a traditional sparking plug and which does not require any modification of the cylinder head passageway for the sparking plug.

16. A method of ignition of an internal combustion engine having at least one engine member, the engine member including:

a combustion chamber of a combustible mixture with fuel and oxidant components fitted with a compression system, an ignition system of the combustible mixture by an igniter, sequential let-through devices for the fuel and oxidant components and for the combustion products, the engine being of the supercharging type by boost pressure of the oxidant components upstream of the engine member, wherein the ignition system includes a closed head substantially spherical with a wall enclosing the igniter in a precombustion chamber, the head including a set of orifices adapted to communicate the combustion chamber and the precombustion chamber so that combustible mixture may flow into the precombustion chamber, said method comprising:

introducing in the combustion chamber the fuel components and the oxidant components which form the combustible mixture in the combustion chamber, the fuel being exclusively liquid,     causing an ignition of the combustible mixture in the precombustion chamber by the igniter, the orifices of the precombustion chamber enabling the ignition of the combustible mixture of the combustion chamber,     said method comprising letting through the orifices unstable species resulting from the combustion in the precombustion chamber in order to enable self-ignition of the combustible mixture of the combustion chamber without however letting through a flame front from the precombustion chamber to the combustion chamber.

17. An engine according to claim 1, wherein the fuel component is petrol.

18. An internal combustion engine with at least one engine member, the engine member including:

a combustion chamber of a combustible mixture with fuel and oxidant components fitted with a compression system,     an ignition system of the combustible mixture by an igniter,     sequential let-through devices for the fuel and oxidant components and for the combustion products,         the engine being of the supercharging type by boost pressure of the oxidant components upstream of the engine member,         wherein the fuel is exclusively liquid, and the ignition system includes a closed head substantially spherical with a wall enclosing the igniter in a precombustion chamber, the head including a set of orifices intended to communicate the combustion chamber and the precombustion chamber so that combustible mixture may flow into the precombustion chamber,         wherein the ignition system and its head are a single component which replaces a traditional sparking plug and which does not require any modification of the cylinder head passageway for the sparking plug.

19. An engine according to claim 18, wherein the fuel component is petrol.

\* \* \* \* \*